United States Patent
Howard

[15] 3,674,114
[45] July 4, 1972

[54] BRAKE LINING TEMPERATURE PROBE

[72] Inventor: Donald W. Howard, South Bend, Ind.
[73] Assignee: The Bendix Corporation
[22] Filed: Sept. 11, 1970
[21] Appl. No.: 71,529

[52] U.S. Cl. .......................... 188/1 A, 200/61.44, 340/52 A, 340/57
[51] Int. Cl. .................................................. F16f 66/00
[58] Field of Search ...................... 116/67 R, 114 AE, 114 Y; 188/1 A; 200/61.4, 61.44; 340/52 A, 52 B, 57

[56] References Cited

UNITED STATES PATENTS

| | | | |
|---|---|---|---|
| 2,494,269 | 1/1950 | Sparkes | 188/1 A UX |
| 1,957,051 | 5/1934 | Norton | 188/1 A UX |
| 3,321,045 | 5/1967 | Veilleux | 188/1 A |
| 3,556,258 | 1/1971 | Winge et al. | 188/1 A |

*Primary Examiner*—Duane A. Reger
*Attorney*—Ken C. Drecker and Plante, Hartz, Smith and Thompson

[57] ABSTRACT

A probe carried in a brake shoe is responsive to the temperature of the lining material and is also responsive to wear of the lining material in excess of a predetermined amount. The probe includes a housing in thermal communication with the lining material and in electrical communication with the rounded brake shoe backing plate. A loop of wire is carried in the probe and is connected to an indicating device in the operator's compartment of the vehicle through an appropriate control device. When the friction material has worn a predetermined amount, the wire loop is brought into engagement with the member to be braked, thereby actuating the indicating device only while the brake is applied. Subsequent wear of the lining material severs the wire loop to actuate the indicating device at all times while the vehicle's ignition is on. One end of a bi-metallic metal strip is secured to the housing and the other end of the bi-metallic strip is spaced a predetermined distance from a terminal affixed to the wire loop. As the temperature of the brake lining increases, the other end of the bi-metallic strip is brought into engagement with the terminal, thereby providing an electrical circuit between the wire loop and the grounded brake shoe backing plate, thereby actuating the indicating device.

4 Claims, 1 Drawing Figure

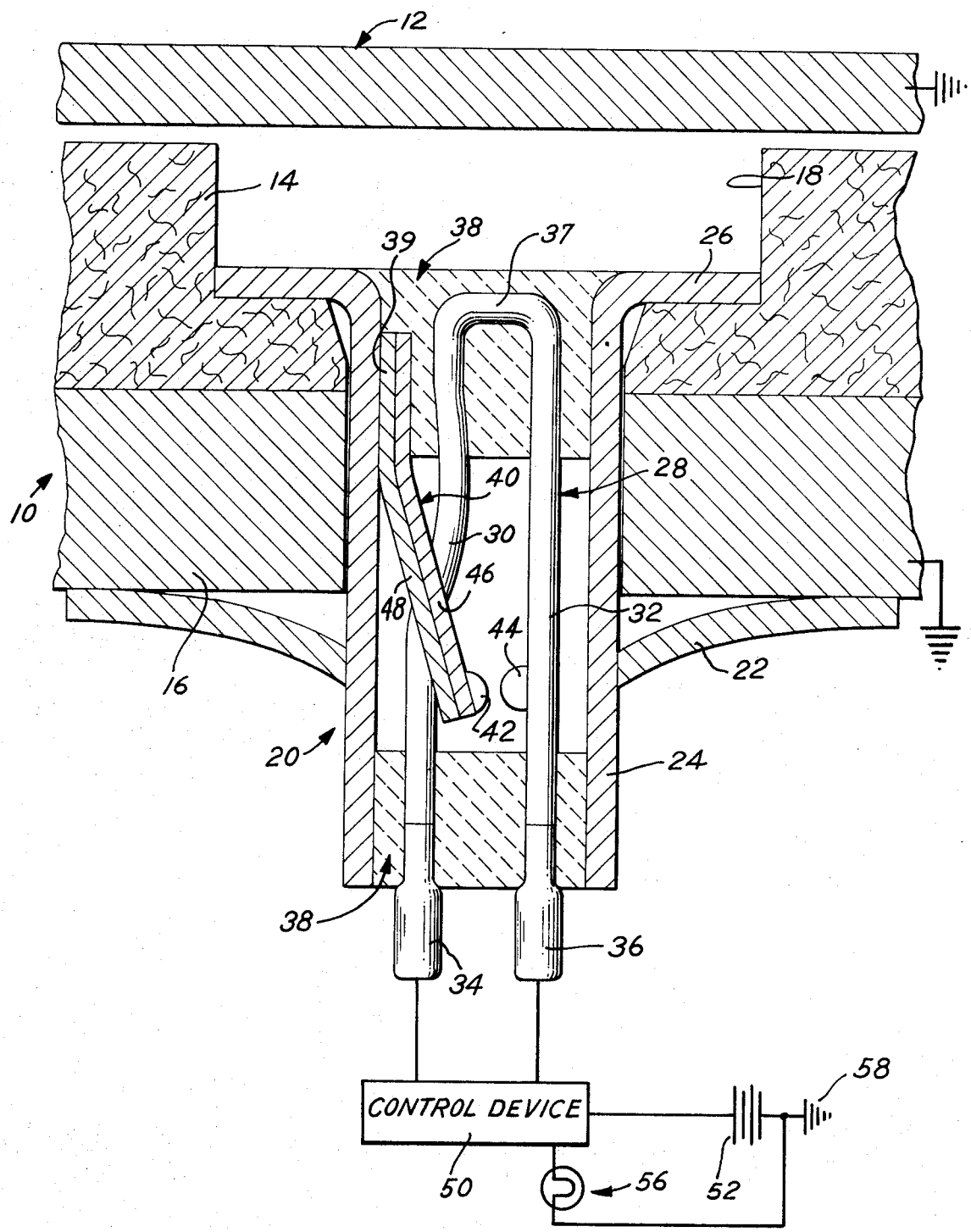

BRAKE LINING TEMPERATURE PROBE

BACKGROUND OF THE INVENTION

This invention relates to a probe which is carried in a brake shoe that is responsive to both the temperature of the lining and to wear of the lining in excess of a predetermined amount.

As is well known to those skilled in the art, when the temperature of the friction material used on the brake shoes in automotive vehicles increases, the effectiveness of the brake decreases. In extreme circumstances, when the linings become very hot, the brakes of the vehicle become nearly inoperative. This most often occurs while the vehicle is descending a steep grade, requiring frequent and prolonged brake applications, thereby increasing the temperature of the lining. It is therefore desirable to provide a signal to the vehicle operator when the temperature of the brake lining exceeds a predetermined level so that the vehicle operator may stop the vehicle and permit the linings to cool. Also, when the friction material on the brake shoes has worn to a dangerously small amount, it is desirable to indicate to the vehicle operator that his brake shoes should be relined. Copending U.S. Patent Application Ser. No. 773,825 filed Nov. 6, 1968, now U.S. Pat. No. 3,556,258 issued Jan. 19, 1971, owned by the assignee of the present invention and incorporated herein by reference discloses such a probe and control device to warn the vehicle operator that the brake shoe linings have worn to a dangerously thin level. Therefore, in order to minimize cost, it is desirable that a single probe be provided that not only indicates wear of the brake lining, but also indicates increase of the lining temperature above a predetermined level.

SUMMARY OF THE INVENTION

Therefore, an important object of my invention is to provide a probe which is sensitive to the temperature level of brake shoe linings to actuate an indicating device to warn the vehicle operator of a dangerously high temperature level.

Another important object of my invention is to provide a single probe that is sensitive to both lining temperature and to lining wear in excess of a predetermined amount.

BRIEF DESCRIPTION OF THE DRAWINGS

The sole FIGURE of the drawings is a schematic view of a portion of a vehicle electrical system, with a brake shoe and probe made pursuant to the teachings of my present invention illustrated in cross section.

DETAILED DESCRIPTION

Referring now to the drawing, a brake shoe, generally indicated by the numeral 10, is forced into engagement with a member to be braked 12 to retard rotation of the latter when a brake application is effected. When my invention is used in drum brakes, the member 12 represents the brake drum; when my invention is used with disc brakes, the member 12 represents the brake rotor. The brake shoe 10 includes a lining 14 made of a friction material of a type well known to those skilled in the art, and a backing plate 16. An opening 18 extends through the lining 14 and the backing plate 16 and receives a probe 20 which extends through the backing plate 16 and into the lining 14. The probe 20 is held in place by a jam washer 22 which is carried by the backing plate 16. The probe 20 includes an annular housing 24 having a flared end provided with a transversely extending flange 26 which engages the lining material 14. A loop of wire 28 is carried within the housing 24 and includes a pair of longitudinally extending leads 30 and 32 that terminate in a corresponding pair of terminals 34 and 36 on the exterior of the housing 24, and a transversely extending end portion 37 that interconnects the leads 30 and 32. The wire loop 28 is retained in the housing 24, but is electrically insulated from the latter, by a ceramic insulating material generally indicated at 38.

One end 39 of an elongated, temperature-responsive, bimetallic element generally indicated at 40 is secured to the housing 24. The other end 42 of the element 40 is normally spaced a predetermined distance from a terminal 44 extending from the lead 32. The element 40 consists of two strips of metal 46 and 48 which are secured together. The thermal expansion coefficient of the strip 48 is much larger than that of the strip 46; therefore, as the temperature of the bi-metallic element is increased, the other end 42 of the element 40 is urged toward the terminal 44.

The terminals 34 and 36 are connected to an appropriate control device indicated generally by the numeral 50. The control device 50 includes circuitry identical to that disclosed in the aforementioned U. S. Pat. application Ser. No. 773,825, and since it forms no part of the present invention, it will not be described in detail herein. The control device 50 is also connected to the vehicle's battery 52 and to an indicating device, such as a lamp 56, which is mounted on the instrument panel in the vehicle operator's compartment. The lamp 56 is also connected to an electrical ground, as at 58. Those skilled in the art will also recognize that the backing plate 16 and the member to be braked 12 are also connected to an electrical ground through the body and chassis of the vehicle.

MODE OF OPERATION

The figure illustrates the position of the various elements of the probe 20 when the brake lining is cool and when a relatively new lining has been installed on the brake shoe 10. As described in the aforementioned application Ser. No. 773,825, now U.S. Pat. No. 3,556,258 issued Jan. 19, 1971, when the lining 14 has worn a distance sufficient to permit the end 37 of the wire loop 28 to engage the grounded drum 12, the control means 50 actuates the indicating light 56 to inform the vehicle operator that his brake linings have worn to a dangerously thin level. However, as long as the end 37 only contacts the grounded drum 12, the indicating light 56 will be actuated only during a brake application. As the lining 14 wears further, engagement of the end 37 of the wire loop 28 with the drum 12 will sever the wire loop 28. Then this occurs, the control device 50 continuously actuates the indicating lamp 56 to warn the vehicle operator that a brake lining failure is imminent.

As long as the end 42 of the element 40 remains spaced from the terminal 44, the indicating light 56 will not be actuated unless the end 37 of the wire loop 28 engages the grounded drum 12 as described above. However, any increase of temperature of the lining 14 will be transmitted to the end 39 of the element 40 through the thermally conductive housing 24. As the temperature of the element 40 is increased, the end 42 will be urged toward the terminal 44 as described above. At some predetermined high level of lining temperature, the end 42 of the element 40 will engage the terminal 44, thereby providing an electrically conductive path from the grounded brake shoe backing plate 16, through the housing 24, the bimetallic element 40, the terminal 44, and the lead 32 to the control device 50. When this occurs the control device 50 actuates the indicating light 56 in exactly the same manner as had the end 37 of the wire loop 28 engaged the grounded brake drum 12. The vehicle operator is thereby provided with a visual indication that the temperature of his brake linings has reached a dangerously high level.

Preferably, the lining temperature at which the indicating light 56 is actuated is low enough so that some reserve braking effectiveness remains. Therefore, when the indicating light 56 is actuated, the vehicle operator may still bring the vehicle to a safe stop to permit the brake lining 14 to cool. When the lining 14 cools, the end 42 of the bi-metallic element 40 moves away from the terminal 44, thereby breaking the connection between the lead 32 and the grounded brake backing plate 16. The control device 50 then extinguishes the indicating light 56, thereby informing the vehicle operator that the brakes of the vehicle are again cool enough for safe driving.

I claim:

1. In a vehicle:

a member to be braked connected to an electrical ground;

a friction member having a backing plate connected to an electrical ground and a lining carried by said backing plate for engagement with said member to be braked;

an electrically conductive probe carried by said friction member electrically insulated from said backing plate and initially spaced a predetermined distance from the edge of said lining, said probe being brought into electrical engagement with said grounded brake drum upon a predetermined amount of lining wear;

a thermally responsive element carried by said friction member in thermal communication with said lining and in electrical communication with said grounded backing plate, said thermally responsive element electrically connecting said probe to said grounded backing plate when the temperature of the lining attains a predetermined level;

a warning device; and a control device connected between said probe and said warning device for actuating the latter when said probe is connected to an electrical ground.

2. The invention of claim 1:

said probe being severed upon engagement with said member to be braked after said lining has worn a distance in excess of said predetermined amount;

said control device being responsive to severing of the probe to continuously actuate said warning device.

3. The invention of claim 1:

said thermally responsive element being a bimetallic strip.

4. The invention of claim 1:

an electrically conductive housing carried by said friction member, said probe being carried by said housing; and insulating material disposed between said probe and said housing to prevent electrical communication therebetween;

said thermally responsive element including a bimetallic strip, one end of said bimetallic strip being secured to said housing, the other end of said strip being initially spaced from said probe, but moving into engagement with said probe when said lining attains said predetermined temperature level.

* * * * *